United States Patent
Kim et al.

(10) Patent No.: US 10,509,987 B1
(45) Date of Patent: Dec. 17, 2019

(54) LEARNING METHOD AND LEARNING DEVICE FOR OBJECT DETECTOR BASED ON RECONFIGURABLE NETWORK FOR OPTIMIZING CUSTOMERS' REQUIREMENTS SUCH AS KEY PERFORMANCE INDEX USING TARGET OBJECT ESTIMATING NETWORK AND TARGET OBJECT MERGING NETWORK, AND TESTING METHOD AND TESTING DEVICE USING THE SAME

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

(*) Notice: Subject to any disclaimer, the term of this patent is extended or adjusted under 35 U.S.C. 154(b) by 0 days.

(21) Appl. No.: 16/254,466

(22) Filed: Jan. 22, 2019

(51) Int. Cl.
*G06K 9/62* (2006.01)
*G06N 3/08* (2006.01)

(52) U.S. Cl.
CPC ......... *G06K 9/6262* (2013.01); *G06K 9/6228* (2013.01); *G06K 9/6232* (2013.01);
(Continued)

(58) Field of Classification Search
CPC ........ G06N 3/0454; G06N 3/08; G06N 3/084; G06N 3/04; G06N 3/0445; G06N 3/082;
(Continued)

(56) References Cited

U.S. PATENT DOCUMENTS 9,934,440 B1 * 4/2018 Kim ................... G06K 9/00791
9,946,960 B1 * 4/2018 Kim ..................... G06K 9/6256
(Continued)

OTHER PUBLICATIONS

"Fusion of Multispectral Data Through Illumination-aware Deep Neural Networks for Pedestrian Detection"; Dayan Guan; Information Fusion 50, Nov. 2018 (Year: 2018).*

*Primary Examiner* — Michael S Osinski
(74) *Attorney, Agent, or Firm* — Husch Blackwell LLP

(57) ABSTRACT

A method for learning parameters of an object detector based on a CNN adaptable to customer's requirements such as KPI by using a target object estimating network and a target object merging network is provided. The CNN can be redesigned when scales of objects change as a focal length or a resolution changes depending on the KPI. The method includes steps of: a learning device instructing convolutional layers to generate a k-th feature map by applying convolution operations to a k-th manipulated image which corresponds to the (k−1)-th target region on an image; and instructing the target object merging network to merge a first to an n-th object detection information, outputted from an FC layer, and backpropagating losses generated by referring to merged object detection information and its corresponding GT. The method can be useful for multi-camera, SVM (surround view monitor), and the like, as accuracy of 2D bounding boxes improves.

16 Claims, 8 Drawing Sheets
(4 of 8 Drawing Sheet(s) Filed in Color)

(52) U.S. Cl.
CPC ......... *G06K 9/6256* (2013.01); *G06K 9/6288* (2013.01); *G06N 3/08* (2013.01)

(58) Field of Classification Search
CPC ........ G06N 3/02; G06N 3/0481; G06N 20/00; G06K 9/4628; G06K 9/3233; G06K 9/6256; G06K 9/6262–6267; G06K 9/3241; G06K 9/66; G06K 9/628; G06K 9/6228; G06K 9/6232; G06K 9/6288; G06K 9/00791; G06K 9/00228; G06K 9/00268; G06K 9/00369; G06K 9/00744; G06K 9/00805; G06K 9/4642; G06T 2207/20084; G06T 2207/20081; G06T 2207/20021; G06T 2210/12; G06T 7/11; G06T 7/73; G06T 3/4046
See application file for complete search history.

(56) References Cited

U.S. PATENT DOCUMENTS

| | | | |
|---|---|---|---|
| 9,947,228 B1* | 4/2018 | Kim | G08G 1/167 |
| 9,996,890 B1* | 6/2018 | Cinnamon | G06T 7/73 |
| 10,002,313 B2* | 6/2018 | Vaca Castano | G06K 9/3233 |
| 10,043,113 B1* | 8/2018 | Kim | G06T 7/10 |
| 10,095,977 B1* | 10/2018 | Kim | G06N 3/0454 |
| 10,169,679 B1* | 1/2019 | Kim | G06K 9/6256 |
| 10,198,671 B1* | 2/2019 | Yang | G06T 11/60 |
| 10,223,610 B1* | 3/2019 | Akselrod-Ballin | G06K 9/6218 |
| 10,304,009 B1* | 5/2019 | Kim | G06K 9/3233 |
| 10,311,321 B1* | 6/2019 | Kim | G06K 9/34 |
| 10,354,159 B2* | 7/2019 | Savvides | G06K 9/3233 |
| 10,354,362 B2* | 7/2019 | Savvides | G06T 3/4046 |
| 2016/0283864 A1* | 9/2016 | Towal | G06K 9/6272 |
| 2017/0124415 A1* | 5/2017 | Choi | G06N 3/08 |
| 2017/0206431 A1* | 7/2017 | Sun | G06N 3/084 |
| 2017/0262996 A1* | 9/2017 | Jain | G06T 7/143 |
| 2017/0308770 A1* | 10/2017 | Jetley | G06K 9/4671 |
| 2018/0068198 A1* | 3/2018 | Savvides | G06K 9/3233 |
| 2018/0096457 A1* | 4/2018 | Savvides | G06K 9/6267 |
| 2018/0114055 A1* | 4/2018 | Wang | G06K 9/00268 |
| 2018/0137642 A1* | 5/2018 | Malisiewicz | G06T 7/11 |
| 2018/0165551 A1* | 6/2018 | Roh | G06K 9/3233 |
| 2018/0247405 A1* | 8/2018 | Kisilev | A61B 5/0013 |
| 2018/0253622 A1* | 9/2018 | Chen | G06N 3/0454 |
| 2018/0268292 A1* | 9/2018 | Choi | G06N 3/08 |
| 2018/0285686 A1* | 10/2018 | Pinheiro | G06F 15/76 |
| 2018/0330238 A1* | 11/2018 | Luciw | G06N 3/08 |
| 2019/0019037 A1* | 1/2019 | Kadav | G06K 9/00744 |
| 2019/0072977 A1* | 3/2019 | Jeon | G06K 9/00791 |
| 2019/0073553 A1* | 3/2019 | Yao | G06K 9/46 |
| 2019/0073568 A1* | 3/2019 | He | G06K 9/6267 |
| 2019/0108640 A1* | 4/2019 | Zhang | G06T 7/11 |
| 2019/0130191 A1* | 5/2019 | Zhou | G06K 9/00744 |
| 2019/0130583 A1* | 5/2019 | Chen | G06T 7/20 |
| 2019/0164290 A1* | 5/2019 | Wang | G06T 7/10 |
| 2019/0172223 A1* | 6/2019 | Vajda | G06T 7/75 |
| 2019/0197331 A1* | 6/2019 | Kwak | G06K 9/00906 |
| 2019/0213438 A1* | 7/2019 | Jones | G06K 9/628 |

* cited by examiner

LEARNING METHOD AND LEARNING DEVICE FOR OBJECT DETECTOR BASED ON RECONFIGURABLE NETWORK FOR OPTIMIZING CUSTOMERS' REQUIREMENTS SUCH AS KEY PERFORMANCE INDEX USING TARGET OBJECT ESTIMATING NETWORK AND TARGET OBJECT MERGING NETWORK, AND TESTING METHOD AND TESTING DEVICE USING THE SAME

FIELD OF THE DISCLOSURE

The present disclosure relates to a method for learning parameters of an object detector based on a reconfigurable CNN for optimizing customers' requirements such as key performance index by using a target object estimating network and a target object merging network; and more particularly, to the method for learning the parameters of the object detector based on the CNN by using the target object estimating network and the target object merging network, including steps of: (a) if at least one training image is acquired, (i) instructing one or more convolutional layers to generate at least one first feature map by applying one or more convolution operations to at least one first manipulated image corresponding to the training image, (ii) instructing an RPN to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, and (iv) instructing an FC layer to apply at least one fully connected operation to the first pooled feature map, to thereby generate first object detection information corresponding to the first objects; (b) (i) instructing the target object estimating network to search for a (k−1)-th target region, corresponding to an area, where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on the training image or its one or more resized images, instructing the convolutional layers to apply the convolution operations to the k-th manipulated image, to thereby generate a k-th feature map, (iii) instructing the RPN to generate one or more k-th object proposals corresponding to each of k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, and (v) instructing the FC layer to apply the fully connected operation to the k-th pooled feature map, to thereby generate k-th object detection information corresponding to the k-th objects, by increasing k from 2 to n; and (c) (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses, and a learning device, a testing method, and a testing device using the same.

BACKGROUND OF THE DISCLOSURE

In machine learning, a convolutional neural network (CNN, or ConvNet) is a class of deep, feed-forward artificial neural network that has successfully been applied to analyzing visual imagery.

A CNN-based object detector may (i) instruct one or more convolutional layers to apply convolution operations to an input image, to thereby generate a feature map corresponding to the input image, (ii) instruct an RPN (Region Proposal Network) to identify proposals corresponding to an object in the input image by using the feature map, (iii) instruct a pooling layer to apply at least one pooling operation to areas on the feature map corresponding to the identified proposals, to thereby generate one or more pooled feature maps, and (iv) instruct an FC (Fully Connected) layer to apply at least one fully connected operation to the acquired pooled feature maps to output class information and regression information for the object, to thereby detect the object on the input image.

However, since the CNN-based object detector uses the feature map whose size is reduced from a size of the input image by the convolutional layer, although large-sized objects in the input image can be easily detected, it is difficult to detect a small-sized object in the input image.

As another example, it is possible to detect the small-sized object by using a resized image obtained by enlarging the input image. In this case, however, the amount of computation by the object detector tremendously increases, thereby deteriorating the performance of the object detector.

Accordingly, the inventors of the present disclosure propose a learning method, a learning device for efficiently detecting objects with various sizes in the input image with less computational time, and a testing method and a testing device using the same are disclosed herein as well.

SUMMARY OF THE DISCLOSURE

It is an object of the present disclosure to solve all the aforementioned problems.

It is another object of the present disclosure to provide an object detector based on a CNN capable of efficiently detecting objects in an image without regard to their sizes.

It is still another object of the present disclosure to provide the object detector based on the CNN capable of detecting small-sized objects on the image without additional computational load.

In accordance with one aspect of the present disclosure, there is provided a method for learning parameters of an object detector based on a CNN by using a target object estimating network and a target object merging network, including steps of: (a) a learning device, if at least one training image is acquired, (i) instructing one or more convolutional layers to generate at least one first feature map by applying one or more convolution operations to at least one first manipulated image corresponding to the training image, (ii) instructing an RPN to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, and (iv) instructing an FC layer to apply at least one fully connected operation to the first pooled feature map, to thereby generate first object detection information corresponding to the first objects; (b) the learning device (i) instructing the target object estimating network to search for a (k−1)-th target region, corresponding to an area, where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on the training image or its one or more resized images, instructing the convolutional layers to apply the convolution operations to the k-th manipulated image, to thereby generate a k-th feature map, (iii) instructing the RPN to generate one or more k-th object proposals corresponding to each of k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, and (v) instructing the FC layer to apply the fully connected operation to the k-th pooled feature map, to thereby generate k-th object detection information corresponding to the k-th objects, by increasing k from 2 to n; and (c) the learning device (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses.

As one example, at the step of (c), the learning device instructs an RPN loss layer to calculate one or more RPN losses by referring to the merged object proposals and their corresponding GTs, to thereby learn parameters of the RPN by backpropagating the RPN losses.

As one example, at the step of (c), supposing that at least one specific identical object is located on the (k−1)-th manipulated image and the k-th manipulated image, and that at least one object proposal, corresponding to the specific identical object, among the (k−1)-th object proposals on the (k−1)-th manipulated image, is a (k−1)-th specific object proposal, and that at least one object proposal, corresponding to the specific identical object, among the k-th object proposals on the k-th manipulated image, is a k-th specific object proposal, the learning device instructs the target object merging network to determine whether an IOU between the (k−1)-th specific object proposal and the k-th specific object proposal is equal to or greater than a first threshold, then if the IOU is determined as less than the first threshold, calculates an adjusted IOU between the (k−1)-th specific object proposal and the k-th specific object proposal, and if the adjusted IOU is determined as equal to or greater than a second threshold, selects (i) one of a higher probability among the (k−1)-th specific object proposal and the k-th specific object proposal, or (ii) one of a larger area calculated on the training image among the (k−1)-th specific object proposal and the k-th specific object proposal, to thereby output the selected one as a specific merged object proposal corresponding to the specific identical object, wherein the IOU is an intersection over union.

As one example, the adjusted IOU is calculated by referring to an area corresponding to the (k−1)-th specific object proposal on the k-th manipulated image and an area corresponding to the k-th specific object proposal on the (k−1)-th manipulated image.

As one example, the learning device instructs the target object merging network to determine whether the IOU is equal to or greater than the first threshold, and if the IOU is determined as equal to or greater than the first threshold, selects (i) one of a higher probability among the (k−1)-th specific object proposal and the k-th specific object proposal, or (ii) one of a larger area calculated on each of the manipulated images among the (k−1)-th specific object proposal and the k-th specific object proposal, to thereby output the selected one as the specific merged object proposal corresponding to the specific identical object.

As one example, at the step of (c), supposing that at least one specific identical object is located on the (k−1)-th manipulated image and the k-th manipulated image, and that at least one object bounding box, corresponding to the specific identical object, among object bounding boxes included in the (k−1)-th object detection information on the (k−1)-th manipulated image, is a (k−1)-th specific object bounding box, and that at least one object bounding box, corresponding to the specific identical object, among object bounding boxes included in the (k−1)-th object detection information on the k-th manipulated image, is a k-th specific object bounding box, the learning device instructs the target object merging network to determine whether an IOU between the (k−1)-th specific object bounding box and the k-th specific object bounding box is equal to or greater than a first threshold, then if the IOU is determined as less than the first threshold, calculates an adjusted IOU between the (k−1)-th specific object bounding box and the k-th specific object bounding box, and if the adjusted IOU is determined as equal to or greater than a second threshold, selects (i) one of a higher probability among the (k−1)-th specific object bounding box and the k-th specific object bounding box, or (ii) one of a larger area calculated on the training image among the (k−1)-th specific object bounding box and the k-th specific object bounding box, to thereby output the selected one as a specific merged object detection information corresponding to the specific identical object, wherein the IOU is an intersection over union.

As one example, the adjusted IOU is calculated by referring to an area corresponding to the (k−1)-th specific object bounding box on the k-th manipulated image and an area corresponding to the k-th specific object bounding box on the (k−1)-th manipulated image.

As one example, the learning device instructs the target object merging network to determine whether the IOU is greater than the first threshold, and if the IOU is determined as equal to or greater than the first threshold, selects (i) one of a higher probability among the (k−1)-th specific object bounding box and the k-th specific object bounding box, or (ii) one of a larger area calculated on each of the manipulated images among the (k−1)-th specific object bounding box and the k-th specific object bounding box, to thereby output the selected one as the specific merged object detection information corresponding to the specific identical object.

In accordance with another aspect of the present disclosure, there is provided a method for testing an object detector based on a CNN by using a target object estimating network and a target object merging network, including steps of: (a) on condition that a learning device (1) (i) has instructed one or more convolutional layers to generate at least one first feature map for training by applying one or more convolution operations to at least one first manipulated image for training corresponding to at least one training image, (ii) has instructed an RPN to generate one or more first object proposals for training corresponding to each of one or more first objects for training in the first manipulated image for training by using the first feature map for training, (iii) has instructed a pooling layer to apply one or more pooling operations to each region, corresponding to each of the first object proposals for training, on the first feature map for training, to thereby generate at least one first pooled feature map for training, and (iv) has instructed an FC layer to apply at least one fully connected operation to the first pooled feature map for training, to thereby generate first object detection information for training corresponding to the first objects for training, (2) (i) has instructed the target object estimating network to search for a (k−1)-th target region for training, corresponding to an area, where at least one target object for training is estimated as located, on a (k−1)-th manipulated image for training, by referring to one or more (k−1)-th object proposals for training on the (k−1)-th manipulated image for training, (ii) if a k-th manipulated image for training is acquired which corresponds to the (k−1)-th target region for training on the training image or its one or more resized images, has instructed the convolutional layers to apply the convolution operations to the k-th manipulated image for training, to thereby generate a k-th feature map for training, (iii) has instructed the RPN to generate one or more k-th object proposals for training corresponding to each of k-th objects for training on the k-th manipulated image for training by referring to the k-th feature map for training, (iv) has instructed the pooling layer to apply the pooling operations to each region, corresponding to each of the k-th object proposals for training, on the k-th feature map for training, to thereby generate at least one k-th pooled feature map for training, and (v) has instructed the FC layer to apply the fully connected operation to the k-th pooled feature map for training, to thereby generate k-th object detection information for training corresponding to the k-th objects for training, by increasing k from 2 to n, and (3) (i) has instructed the target object merging network to generate merged object proposals for training by merging the first object proposals for training to the n-th object proposals for training, and generate merged object detection information for training by merging the first object detection information for training to the n-th object detection information for training, and (ii) has instructed an FC loss layer to generate one or more FC losses by referring to the merged object detection information for training and its corresponding GT, to thereby learn at least part of parameters of the FC layer and the convolutional layers by backpropagating the FC losses; a testing device, if at least one test image is acquired, (i) instructing the convolutional layers to generate at least one first feature map for testing by applying the convolution operations to at least one first manipulated image for testing corresponding to the test image, (ii) instructing the RPN to generate one or more first object proposals for testing corresponding to each of one or more first objects for testing in the first manipulated image for testing by using the first feature map for testing, (iii) instructing the pooling layer to apply the pooling operations to each region, corresponding to each of the first object proposals for testing, on the first feature map for testing, to thereby generate at least one first pooled feature map for testing, and (iv) instructing the FC layer to apply the fully connected operation to the first pooled feature map for testing, to thereby generate first object detection information for testing corresponding to the first objects for testing; (b) the testing device (i) instructing the target object estimating network to search for a (k−1)-th target region for testing, corresponding to an area, where at least one target object for testing is estimated as located, on a (k−1)-th manipulated image for testing, by referring to one or more (k−1)-th object proposals for testing on the (k−1)-th manipulated image for testing, (ii) if a k-th manipulated image for testing is acquired which corresponds to the (k−1)-th target region for testing on the test image or its one or more resized images, instructing the convolutional layers to apply the convolution operations to the k-th manipulated image for testing, to thereby generate a k-th feature map for testing, (iii) instructing the RPN to generate one or more k-th object proposals for testing corresponding to each of k-th objects for testing on the k-th manipulated image for testing by referring to the k-th feature map for testing, (iv) instructing the pooling layer to apply the pooling operations to each region, corresponding to each of the k-th object proposals for testing, on the k-th feature map for testing, to thereby generate at least one k-th pooled feature map for testing, and (v) instructing the FC layer to apply the fully connected operation to the k-th pooled feature map for testing, to thereby generate k-th object detection information for testing corresponding to the k-th objects for testing, by increasing k from 2 to n; and (c) the learning device (i) instructing the target object merging network to generate merged object proposals for testing by merging the first object proposals for testing to the n-th object proposals for testing, and generate merged object detection information for testing by merging the first object detection information for testing to the n-th object detection information for testing.

As one example, at the step of (c), supposing that at least one specific identical object for testing is located on the (k−1)-th manipulated image for testing and the k-th manipulated image for testing, and that at least one object proposal for testing, corresponding to the specific identical object for testing, among the (k−1)-th object proposals for testing on the (k−1)-th manipulated image for testing, is a (k−1)-th specific object proposal for testing, and that at least one object proposal for testing, corresponding to the specific identical object for testing, among the k-th object proposals for testing on the k-th manipulated image for testing, is a k-th specific object proposal for testing, the testing device instructs the target object merging network to determine whether an IOU for testing between the (k−1)-th specific object proposal for testing and the k-th specific object proposal for testing is equal to or greater than a first threshold, then if the IOU for testing is determined as less than the first threshold, calculates an adjusted IOU for testing between the (k−1)-th specific object proposal for testing and the k-th specific object proposal for testing, and if the adjusted IOU for testing is determined as equal to or greater than a second threshold, selects (i) one of a higher probability among the (k−1)-th specific object proposal for testing and the k-th specific object proposal for testing, or (ii) one of a larger area calculated on the test image among the (k−1)-th specific object proposal for testing and the k-th specific object proposal for testing, to thereby output the selected one as a specific merged object proposal for testing corresponding to the specific identical object for testing, wherein the IOU for testing is an intersection over union.

As one example, the adjusted IOU for testing is calculated by referring to an area corresponding to the (k−1)-th specific object proposal for testing on the k-th manipulated image for testing and an area corresponding to the k-th specific object proposal for testing on the (k−1)-th manipulated image for testing.

As one example, the testing device instructs the target object merging network to determine whether the IOU for testing is equal to or greater than the first threshold, and if the IOU for testing is determined as equal to or greater than the first threshold, selects (i) one of a higher probability among the (k−1)-th specific object proposal for testing and the k-th specific object proposal for testing, or (ii) one of a larger area calculated on each of the manipulated images for testing among the (k−1)-th specific object proposal for testing and the k-th specific object proposal for testing, to thereby output the selected one as the specific merged object proposal for testing corresponding to the specific identical object for testing.

As one example, at the step of (c), supposing that at least one specific identical object for testing is located on the (k−1)-th manipulated image for testing and the k-th manipulated image for testing, and that at least one object bounding box for testing, corresponding to the specific identical object for testing, among object bounding boxes for testing included in the (k−1)-th object detection information for testing on the (k−1)-th manipulated image for testing, is a (k−1)-th specific object bounding box for testing, and that at least one object bounding box for testing, corresponding to the specific identical object for testing, among object bounding boxes for testing included in the (k−1)-th object detection information for testing on the k-th manipulated image for testing, is a k-th specific object bounding box for testing, the testing device instructs the target object merging network to determine whether an IOU for testing between the (k−1)-th specific object bounding box for testing and the k-th specific object bounding box for testing is equal to or greater than a first threshold, then if the IOU for testing is determined as less than the first threshold, calculates an adjusted IOU for testing between the (k−1)-th specific object bounding box for testing and the k-th specific object bounding box for testing, and if the adjusted IOU for testing is determined as equal to or greater than a second threshold, selects (i) one of a higher probability among the (k−1)-th specific object bounding box for testing and the k-th specific object bounding box for testing, or (ii) one of a larger area calculated on the test image among the (k−1)-th specific object bounding box for testing and the k-th specific object bounding box for testing, to thereby output the selected one as a specific merged object detection information for testing corresponding to the specific identical object for testing, wherein the IOU for testing is an intersection over union.

As one example, the adjusted IOU for testing is calculated by referring to an area corresponding to the (k−1)-th specific object bounding box for testing on the k-th manipulated image for testing and an area corresponding to the k-th specific object bounding box for testing on the (k−1)-th manipulated image for testing.

As one example, the testing device instructs the target object merging network to determine whether the IOU for testing is greater than the first threshold, and if the IOU for testing is determined as equal to or greater than the first threshold, selects (i) one of a higher probability among the (k−1)-th specific object bounding box for testing and the k-th specific object bounding box for testing, or (ii) one of a larger area calculated on each of the manipulated images for testing among the (k−1)-th specific object bounding box for testing and the k-th specific object bounding box for testing, to thereby output the selected one as the specific merged object detection information for testing corresponding to the specific identical object for testing.

In accordance with still another aspect of the present disclosure, there is provided a learning device for learning parameters of an object detector based on a CNN by using a target object estimating network and a target object merging network, including: at least one memory that stores instructions; and at least one processor configured to execute the instructions to: perform processes of (I) (i) instructing one or more convolutional layers to generate at least one first feature map by applying one or more convolution operations to at least one first manipulated image corresponding to at least one training image, (ii) instructing an RPN to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, and (iv) instructing an FC layer to apply at least one fully connected operation to the first pooled feature map, to thereby generate first object detection information corresponding to the first objects, (II) (i) instructing the target object estimating network to search for a (k−1)-th target region, corresponding to an area, where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on the training image or its one or more resized images, instructing the convolutional layers to apply the convolution operations to the k-th manipulated image, to thereby generate a k-th feature map, (iii) instructing the RPN to generate one or more k-th object proposals corresponding to each of k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, and (v) instructing the FC layer to apply the fully connected operation to the k-th pooled feature map, to thereby generate k-th object detection information corresponding to the k-th objects, by increasing k from 2 to n, and (III) (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses.

As one example, at the process of (III), the processor instructs an RPN loss layer to calculate one or more RPN losses by referring to the merged object proposals and their corresponding GTs, to thereby learn parameters of the RPN by backpropagating the RPN losses.

As one example, at the process of (III), supposing that at least one specific identical object is located on the (k−1)-th manipulated image and the k-th manipulated image, and that at least one object proposal, corresponding to the specific identical object, among the (k−1)-th object proposals on the (k−1)-th manipulated image, is a (k−1)-th specific object proposal, and that at least one object proposal, corresponding to the specific identical object, among the k-th object proposals on the k-th manipulated image, is a k-th specific object proposal, the processor instructs the target object merging network to determine whether an IOU between the (k−1)-th specific object proposal and the k-th specific object proposal is equal to or greater than a first threshold, then if the IOU is determined as less than the first threshold, calculates an adjusted IOU between the (k−1)-th specific object proposal and the k-th specific object proposal, and if the adjusted IOU is determined as equal to or greater than a second threshold, selects (i) one of a higher probability among the (k−1)-th specific object proposal and the k-th specific object proposal, or (ii) one of a larger area calculated on the training image among the (k−1)-th specific object proposal and the k-th specific object proposal, to thereby output the selected one as a specific merged object proposal corresponding to the specific identical object, wherein the IOU is an intersection over union.

As one example, the adjusted IOU is calculated by referring to an area corresponding to the (k−1)-th specific object proposal on the k-th manipulated image and an area corresponding to the k-th specific object proposal on the (k−1)-th manipulated image.

As one example, the processor instructs the target object merging network to determine whether the IOU is equal to or greater than the first threshold, and if the IOU is determined as equal to or greater than the first threshold, selects (i) one of a higher probability among the (k−1)-th specific object proposal and the k-th specific object proposal, or (ii) one of a larger area calculated on each of the manipulated images among the (k−1)-th specific object proposal and the k-th specific object proposal, to thereby output the selected one as the specific merged object proposal corresponding to the specific identical object.

As one example, at the process of (III), supposing that at least one specific identical object is located on the (k−1)-th manipulated image and the k-th manipulated image, and that at least one object bounding box, corresponding to the specific identical object, among object bounding boxes included in the (k−1)-th object detection information on the (k−1)-th manipulated image, is a (k−1)-th specific object bounding box, and that at least one object bounding box, corresponding to the specific identical object, among object bounding boxes included in the (k−1)-th object detection information on the k-th manipulated image, is a k-th specific object bounding box, the processor instructs the target object merging network to determine whether an IOU between the (k−1)-th specific object bounding box and the k-th specific object bounding box is equal to or greater than a first threshold, then if the IOU is determined as less than the first threshold, calculates an adjusted IOU between the (k−1)-th specific object bounding box and the k-th specific object bounding box, and if the adjusted IOU is determined as equal to or greater than a second threshold, selects (i) one of a higher probability among the (k−1)-th specific object bounding box and the k-th specific object bounding box, or (ii) one of a larger area calculated on the training image among the (k−1)-th specific object bounding box and the k-th specific object bounding box, to thereby output the selected one as a specific merged object detection information corresponding to the specific identical object, wherein the IOU is an intersection over union.

As one example, the adjusted IOU is calculated by referring to an area corresponding to the (k−1)-th specific object bounding box on the k-th manipulated image and an area corresponding to the k-th specific object bounding box on the (k−1)-th manipulated image.

As one example, the processor instructs the target object merging network to determine whether the IOU is greater than the first threshold, and if the IOU is determined as equal to or greater than the first threshold, selects (i) one of a higher probability among the (k−1)-th specific object bounding box and the k-th specific object bounding box, or (ii) one of a larger area calculated on each of the manipulated images among the (k−1)-th specific object bounding box and the k-th specific object bounding box, to thereby output the selected one as the specific merged object detection information corresponding to the specific identical object.

In accordance with still yet another aspect of the present disclosure, there is provided a testing device for testing an object detector based on a CNN by using a target object estimating network and a target object merging network, including: at least one memory that stores instructions; and at least one processor, on condition that a learning device (1) (i) has instructed one or more convolutional layers to generate at least one first feature map for training by applying one or more convolution operations to at least one first manipulated image for training corresponding to at least one training image, (ii) has instructed an RPN to generate one or more first object proposals for training corresponding to each of one or more first objects for training in the first manipulated image for training by using the first feature map for training, (iii) has instructed a pooling layer to apply one or more pooling operations to each region, corresponding to each of the first object proposals for training, on the first feature map for training, to thereby generate at least one first pooled feature map for training, and (iv) has instructed an FC layer to apply at least one fully connected operation to the first pooled feature map for training, to thereby generate first object detection information for training corresponding to the first objects for training, (2) (i) has instructed the target object estimating network to search for a (k−1)-th target region for training, corresponding to an area, where at least one target object for training is estimated as located, on a (k−1)-th manipulated image for training, by referring to one or more (k−1)-th object proposals for training on the (k−1)-th manipulated image for training, (ii) if a k-th manipulated image for training is acquired which corresponds to the (k−1)-th target region for training on the training image or its one or more resized images, has instructed the convolutional layers to apply the convolution operations to the k-th manipulated image for training, to thereby generate a k-th feature map for training, (iii) has instructed the RPN to generate one or more k-th object proposals for training corresponding to each of k-th objects for training on the k-th manipulated image for training by referring to the k-th feature map for training, (iv) has instructed the pooling layer to apply the pooling operations to each region, corresponding to each of the k-th object proposals for training, on the k-th feature map for training, to thereby generate at least one k-th pooled feature map for training, and (v) has instructed the FC layer to apply the fully connected operation to the k-th pooled feature map for training, to thereby generate k-th object detection information for training corresponding to the k-th objects for training, by increasing k from 2 to n, and (3) (i) has instructed the target object merging network to generate merged object proposals for training by merging the first object proposals for training to the n-th object proposals for training, and generate merged object detection information for training by merging the first object detection information for training to the n-th object detection information for training, and (ii) has instructed an FC loss layer to generate one or more FC losses by referring to the merged object detection information for training and its corresponding GT, to thereby learn at least part of parameters of the FC layer and the convolutional layers by backpropagating the FC losses; configured to execute the instructions to: perform processes of (I) (i) instructing the convolutional layers to generate at least one first feature map for testing by applying the convolution operations to at least one first manipulated image for testing corresponding to at least one test image, (ii) instructing the RPN to generate one or more first object proposals for testing corresponding to each of one or more first objects for testing in the first manipulated image for testing by using the first feature map for testing, (iii) instructing the pooling layer to apply the pooling operations to each region, corresponding to each of the first object proposals for testing, on the first feature map for testing, to thereby generate at least one first pooled feature map for testing, and (iv) instructing the FC layer to apply the fully connected operation to the first pooled feature map for testing, to thereby generate first object detection information for testing corresponding to the first objects for testing, (II) (i) instructing the target object estimating network to search for a (k−1)-th target region for testing, corresponding to an area, where at least one target object for testing is estimated as located, on a (k−1)-th manipulated image for testing, by referring to one or more (k−1)-th object proposals for testing on the (k−1)-th manipulated image for testing, (ii) if a k-th manipulated image for testing is acquired which corresponds to the (k−1)-th target region for testing on the test image or its one or more resized images, instructing the convolutional layers to apply the convolution operations to the k-th manipulated image for testing, to thereby generate a k-th feature map for testing, (iii) instructing the RPN to generate one or more k-th object proposals for testing corresponding to each of k-th objects for testing on the k-th manipulated image for testing by referring to the k-th feature map for testing, (iv) instructing the pooling layer to apply the pooling operations to each region, corresponding to each of the k-th object proposals for testing, on the k-th feature map for testing, to thereby generate at least one k-th pooled feature map for testing, and (v) instructing the FC layer to apply the fully connected operation to the k-th pooled feature map for testing, to thereby generate k-th object detection information for testing corresponding to the k-th objects for testing, by increasing k from 2 to n, and (III) (i) instructing the target object merging network to generate merged object proposals for testing by merging the first object proposals for testing to the n-th object proposals for testing, and generate merged object detection information for testing by merging the first object detection information for testing to the n-th object detection information for testing.

As one example, at the process of (III), supposing that at least one specific identical object for testing is located on the (k−1)-th manipulated image for testing and the k-th manipulated image for testing, and that at least one object proposal for testing, corresponding to the specific identical object for testing, among the (k−1)-th object proposals for testing on the (k−1)-th manipulated image for testing, is a (k−1)-th specific object proposal for testing, and that at least one object proposal for testing, corresponding to the specific identical object for testing, among the k-th object proposals for testing on the k-th manipulated image for testing, is a k-th specific object proposal for testing, the processor instructs the target object merging network to determine whether an IOU for testing between the (k−1)-th specific object proposal for testing and the k-th specific object proposal for testing is equal to or greater than a first threshold, then if the IOU for testing is determined as less than the first threshold, calculates an adjusted IOU for testing between the (k−1)-th specific object proposal for testing and the k-th specific object proposal for testing, and if the adjusted IOU for testing is determined as equal to or greater than a second threshold, selects (i) one of a higher probability among the (k−1)-th specific object proposal for testing and the k-th specific object proposal for testing, or (ii) one of a larger area calculated on the test image among the (k−1)-th specific object proposal for testing and the k-th specific object proposal for testing, to thereby output the selected one as a specific merged object proposal for testing corresponding to the specific identical object for testing, wherein the IOU for testing is an intersection over union.

As one example, the adjusted IOU for testing is calculated by referring to an area corresponding to the (k−1)-th specific object proposal for testing on the k-th manipulated image for testing and an area corresponding to the k-th specific object proposal for testing on the (k−1)-th manipulated image for testing.

As one example, the processor instructs the target object merging network to determine whether the IOU for testing is equal to or greater than the first threshold, and if the IOU for testing is determined as equal to or greater than the first threshold, selects (i) one of a higher probability among the (k−1)-th specific object proposal for testing and the k-th specific object proposal for testing, or (ii) one of a larger area calculated on each of the manipulated images for testing among the (k−1)-th specific object proposal for testing and the k-th specific object proposal for testing, to thereby output the selected one as the specific merged object proposal for testing corresponding to the specific identical object for testing.

As one example, at the process of (III), supposing that at least one specific identical object for testing is located on the (k−1)-th manipulated image for testing and the k-th manipulated image for testing, and that at least one object bounding box for testing, corresponding to the specific identical object for testing, among object bounding boxes for testing included in the (k−1)-th object detection information for testing on the (k−1)-th manipulated image for testing, is a (k−1)-th specific object bounding box for testing, and that at least one object bounding box for testing, corresponding to the specific identical object for testing, among object bounding boxes for testing included in the (k−1)-th object detection information for testing on the k-th manipulated image for testing, is a k-th specific object bounding box for testing, the processor instructs the target object merging network to determine whether an IOU for testing between the (k−1)-th specific object bounding box for testing and the k-th specific object bounding box for testing is equal to or greater than a first threshold, then if the IOU for testing is determined as less than the first threshold, calculates an adjusted IOU for testing between the (k−1)-th specific object bounding box for testing and the k-th specific object bounding box for testing, and if the adjusted IOU for testing is determined as equal to or greater than a second threshold, selects (i) one of a higher probability among the (k−1)-th specific object bounding box for testing and the k-th specific object bounding box for testing, or (ii) one of a larger area calculated on the test image among the (k−1)-th specific object bounding box for testing and the k-th specific object bounding box for testing, to thereby output the selected one as a specific merged object detection information for testing corresponding to the specific identical object for testing, wherein the IOU for testing is an intersection over union.

As one example, the adjusted IOU for testing is calculated by referring to an area corresponding to the (k−1)-th specific object bounding box for testing on the k-th manipulated image for testing and an area corresponding to the k-th specific object bounding box for testing on the (k−1)-th manipulated image for testing.

As one example, the processor instructs the target object merging network to determine whether the IOU for testing is greater than the first threshold, and if the IOU for testing is determined as equal to or greater than the first threshold, selects (i) one of a higher probability among the (k−1)-th specific object bounding box for testing and the k-th specific object bounding box for testing, or (ii) one of a larger area calculated on each of the manipulated images for testing among the (k−1)-th specific object bounding box for testing and the k-th specific object bounding box for testing, to thereby output the selected one as the specific merged object detection information for testing corresponding to the specific identical object for testing.

In addition, recordable media that are readable by a computer for storing a computer program to execute the method of the present disclosure is further provided.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

Figure 1:
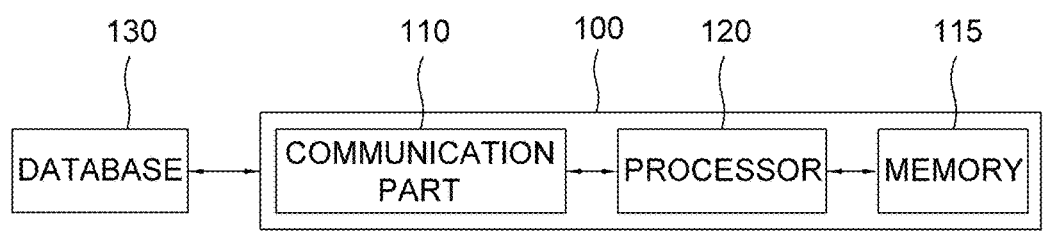

FIG. 1 is a drawing schematically illustrating a learning device for learning an object detector based on a CNN using a target object estimating network and a target object merging network in accordance with one example embodiment of the present disclosure.

Figure 2:
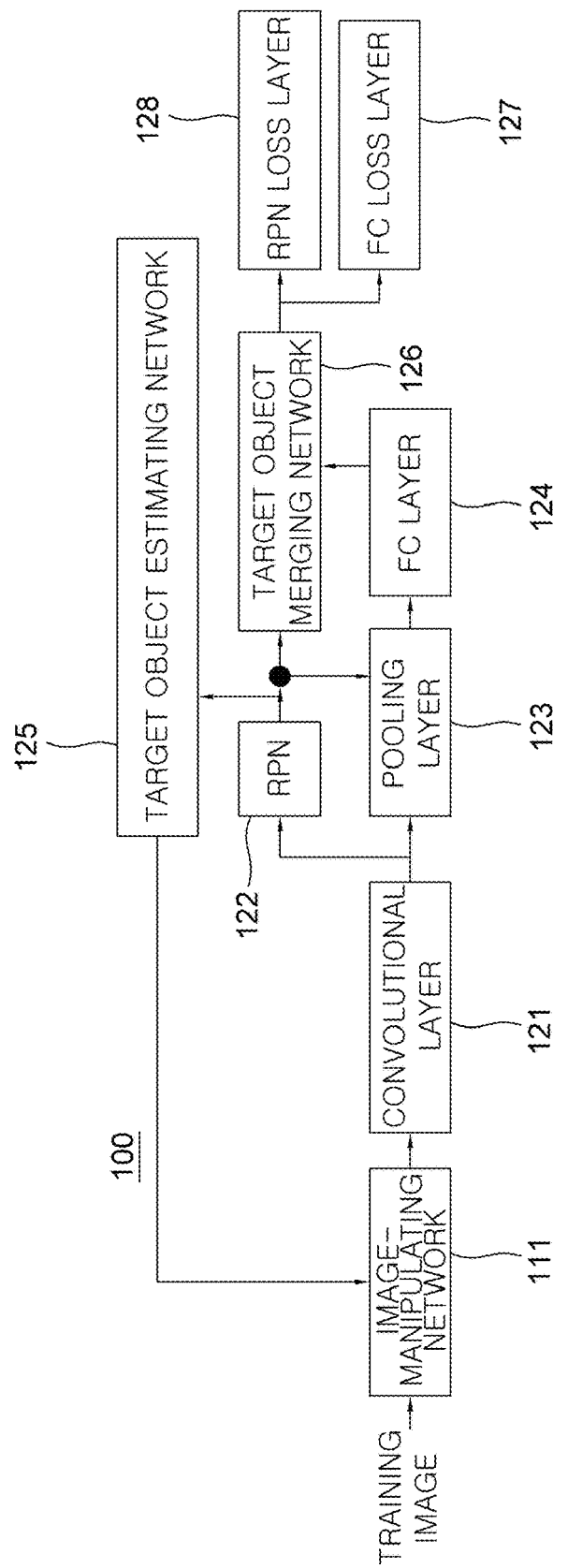

FIG. 2 is a drawing schematically illustrating a learning method for learning the object detector based on the CNN using the target object estimating network and the target object merging network in accordance with one example embodiment of the present disclosure.

Figure 3:
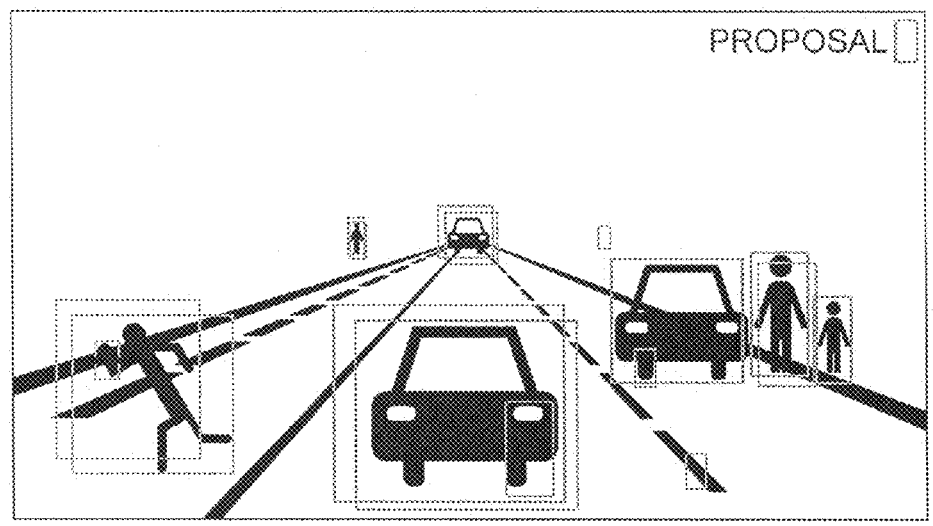

FIG. 3 is a drawing schematically illustrating object proposals, outputted from an RPN, to be considered for the learning method for the object detector based on the CNN using the target object estimating network and the target object merging network in accordance with one example embodiment of the present disclosure.

Figure 4:
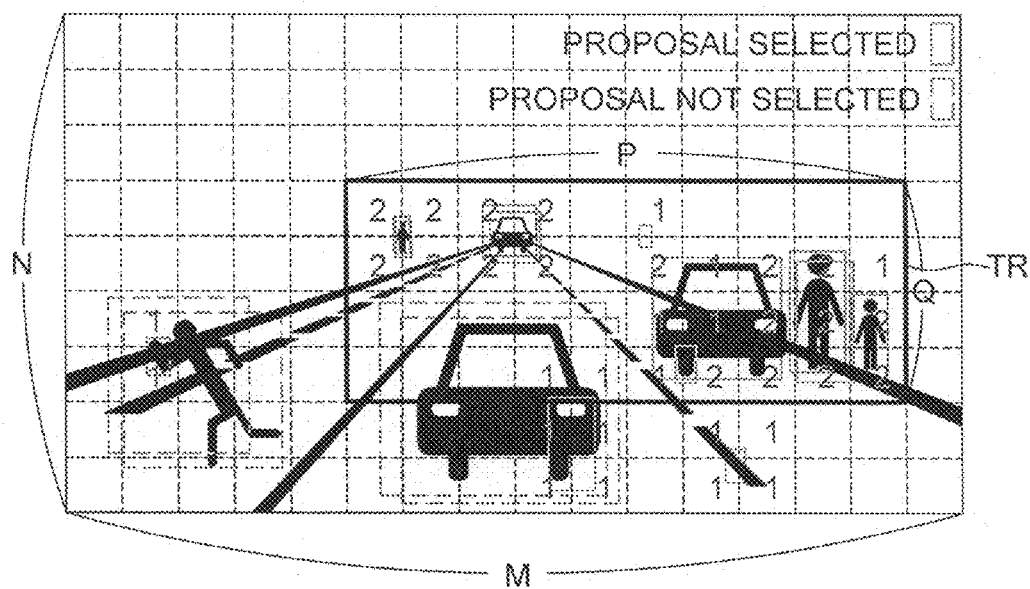

FIG. 4 is a drawing schematically illustrating a process of searching for target regions, by using the object proposals outputted from the RPN, to be considered for the learning method for the object detector based on the CNN using the target object estimating network and the target object merging network in accordance with one example embodiment of the present disclosure.

Figure 5:
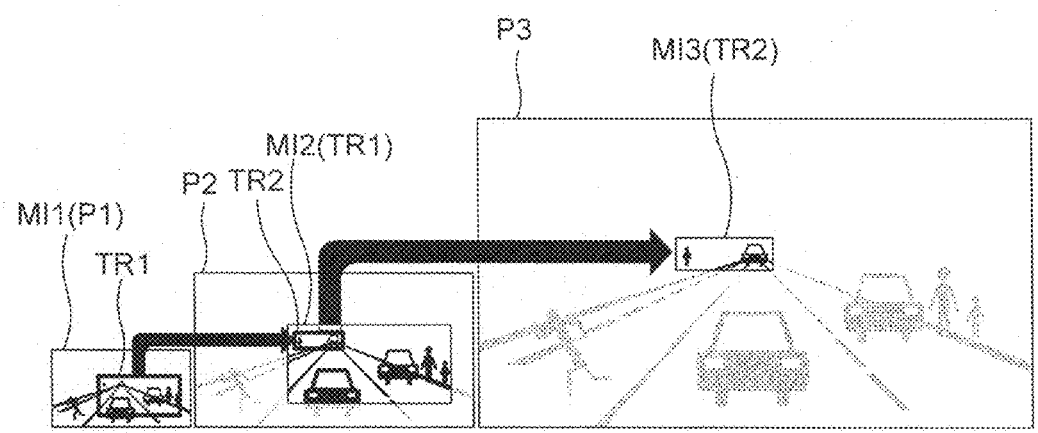

FIG. 5 is a drawing schematically illustrating a process of detecting at least one target object by using manipulated images to be considered for the learning method for the object detector based on the CNN using the target object estimating network and the target object merging network in accordance with one example embodiment of the present disclosure.

Figure 6:
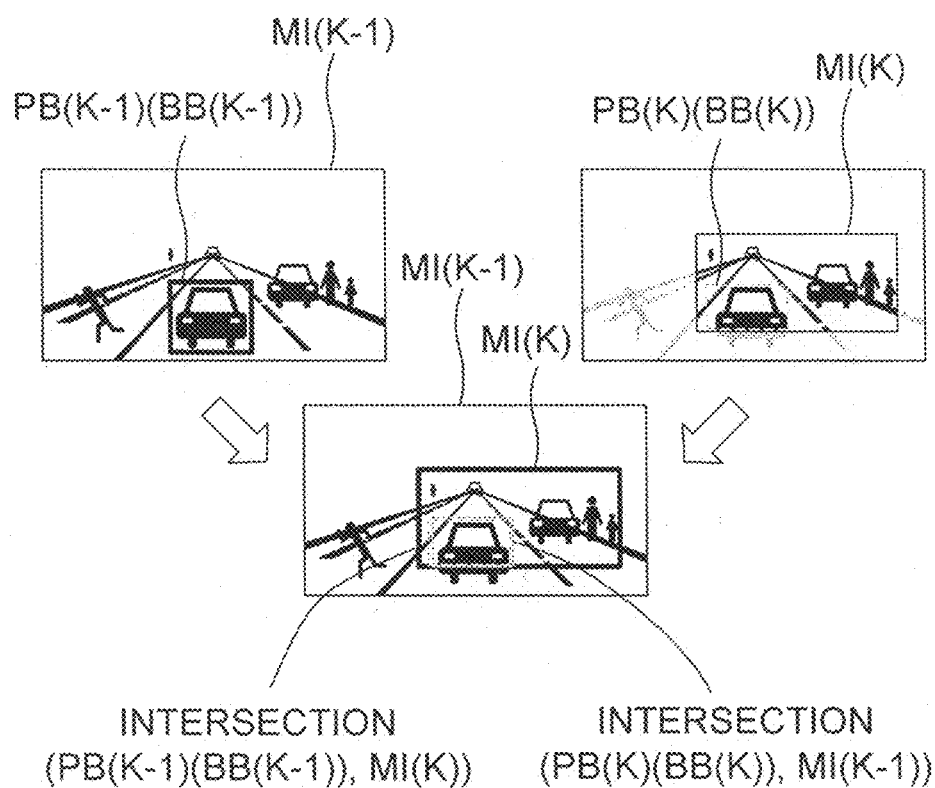

FIG. 6 is a drawing schematically illustrating a process of merging object detection information and the object proposals corresponding to at least one object included in different target regions, to be considered for the learning method for the object detector based on the CNN using the target object estimating network and the target object merging network in accordance with one example embodiment of the present disclosure.

Figure 7:
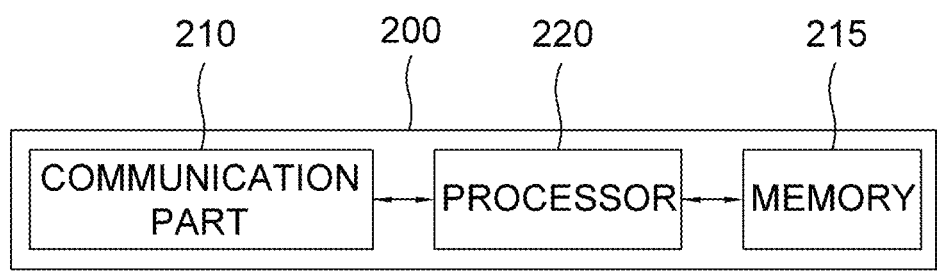

FIG. 7 is a drawing schematically illustrating a testing device for testing the object detector based on the CNN using the target object estimating network and the target object merging network in accordance with one example embodiment of the present disclosure.

Figure 8:
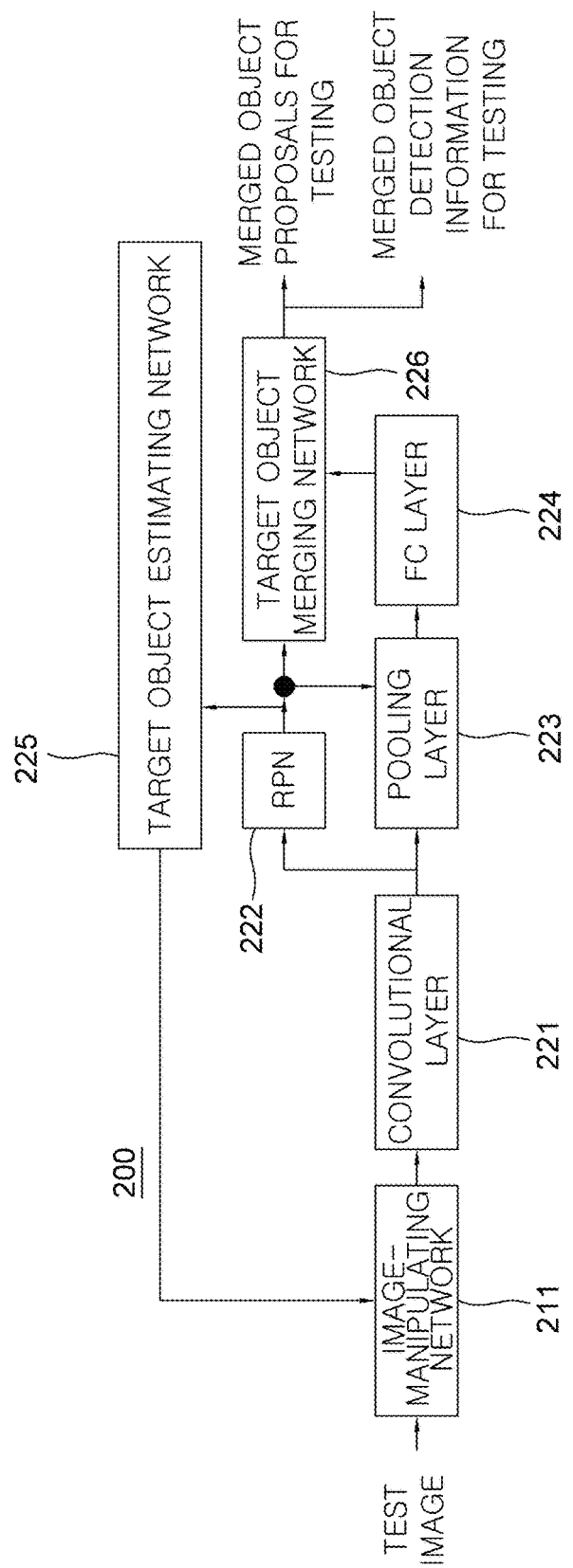

FIG. 8 is a drawing schematically illustrating a testing method for testing the object detector based on the CNN using the target object estimating network and the target object merging network in accordance with one example embodiment of the present disclosure.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device for learning an object detector based on a CNN using a target object estimating network and a target object merging network in accordance with one example embodiment of the present disclosure. By referring to FIG. 1, the learning device 100 may include a communication part 110 and a processor 120.

First, the communication part 110 may acquire or support another device to acquire at least one training image.

Herein, the training image may be stored in a database 130, and the database 130 may store at least one ground truth, i.e., GT, of class information on each of one or more objects in the training image and location information on each of the objects.

In addition, the learning device may further include a memory 115 capable of storing computer readable instructions for performing following processes. As one example, the processor, the memory, a medium, etc. may be integrated with an integrated processor.

Next, the processor 120 may perform or support another device to perform processes of (i) instructing one or more convolutional layers to generate at least one first feature map by applying one or more convolution operations to at least one first manipulated image corresponding to the training image, (ii) instructing an RPN to generate one or more first object proposals corresponding to each of the first objects in the first manipulated image by using the first feature map, (iii) instructing a pooling layer to apply one or more pooling operations to each region, corresponding to each of the first object proposals, on the first feature map, to thereby generate at least one first pooled feature map, (iv) instructing an FC layer to apply at least one fully connected operation to the first pooled feature map, to thereby generate first object detection information corresponding to the first objects. Then, the processor 120 may perform or support another device to perform processes of (i) instructing the target object estimating network to search for a (k−1)-th target region, corresponding to an area, where at least one target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on the training image or its resized images, instructing the convolutional layers to apply the convolution operations to the k-th manipulated image, to thereby generate a k-th feature map, (iii) instructing the RPN to generate one or more k-th object proposals corresponding to each of one or more k-th objects on the k-th manipulated image by referring to the k-th feature map, (iv) instructing the pooling layer to apply the pooling operations to each region, on the k-th feature map, corresponding to each of the k-th object proposals, to thereby generate at least one k-th pooled feature map, (v) instructing the FC layer to apply the fully connected operation to the k-th pooled feature map, to thereby generate k-th object detection information corresponding to the k-th objects, by increasing k from 2 to n.

Then the processor 120 may perform processes of (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses.

Also, the processor 120 may instruct at least one RPN loss layer to generate one or more RPN losses by referring to the merged object proposals and their corresponding GTs, to thereby adjust at least part of parameters of the RPN by backpropagating the RPN losses.

Herein, the learning device 100 in accordance with one example of the present disclosure may be a computing device, and may be any digital device with a processor capable of computation. For reference, although FIG. 1 shows the single learning device 100, the scope of the present disclosure is not limited thereto. For example, the learning device may be configured as several devices to perform its functions.

A method for learning parameters of the object detector based on the CNN using the target object estimating network and the target object merging network by using the learning device 100 in accordance with one example embodiment of the present disclosure is described by referring to FIG. 2 as follows.

First of all, if the training image is inputted, the learning device 100 may instruct a convolutional layer 121 to apply the convolution operations to the first manipulated image corresponding to the training image, to thereby generate the first feature map. Herein, the convolutional layer 121 may be a single convolutional layer or multiple convolutional layers.

Herein, the learning device 100 may instruct an image-manipulating network 111 to generate an image pyramid including multiple images with different sizes which are created by manipulating the training image, and may input one image included in the image pyramid into the convolutional layer 121 as the first manipulated image.

Next, the learning device 100 may instruct an RPN 122 to generate one or more first object proposals corresponding to the first objects in the first manipulated image by using the first feature map.

As one example, by referring to FIG. 3, the first object proposals outputted from the RPN 122 may correspond to each of the first objects in the first manipulated image, and each of the first object proposals may include information on each proposal box having location information corresponding to each of the first objects, i.e., a tagged area and information on whether it is an object. Herein, the information on whether it is an object may include probability information by which said each object proposal is estimated as an object, and information on the proposal box may include probability information by which the proposal box is estimated as matching the location of the object.

Next, the learning device 100 may instruct a pooling layer 123 to generate the first pooled feature map by applying the pooling operation to at least one region, corresponding to the first object proposals, on the first feature map, and may instruct an FC layer 124 to generate first object detection information corresponding to the first objects by applying the fully connected operation to the first pooled feature map.

Herein, the first object detection information may include information on bounding boxes, i.e., location information on each of the first objects, and class information on each of the first objects corresponding to the first object proposals. Also, the class information may include probability information by which each of the first objects is estimated as each class, and the information on the bounding boxes may include probability information by which each of the bounding boxes is estimated as matching the location of each of the first objects.

Then, the learning device 100 may instruct a target object estimating network 125 to search for a first target region, corresponding to an area, where the target object is estimated as located, on the first manipulated image, by referring to the first object proposals on the first manipulated image.

As one example, by referring to FIG. 4, the target object estimating network 125 may (i) divide the first manipulated image into an M×N grid, (ii) generate at least one histogram representing the number of each corresponding proposals, among the (K−1)-th object proposals, per each cell of the grid, wherein each partial area or each whole area of said each corresponding proposals is present in its corresponding cell of the grid, where, preferably, the sizes of said each corresponding proposals are smaller than a predetermined size corresponding to a size of the target object, among the object proposals outputted from the RPN 122 and (iii) determine the first target region TR by using at least one region of a moving window with a size of P×Q corresponding to a size of the first target region, where the at least one region has a largest value of summation of the histogram among all regions to be occupied by changing a location of the moving window.

Next, the learning device 100 may instruct the image-manipulating network 111 to acquire a second manipulated image corresponding to the first target region TR on the training image or its resized images, i.e., a so-called resized training image.

Herein, the learning device 100 may instruct the image-manipulating network 111 to generate the resized training image by enlarging a size of the training image into a size larger than that of the first manipulated image, and crop at least one region, corresponding to the first target region TR, on the resized training image, to thereby generate the second manipulated image, or crop and resize at least one region, corresponding to the first target region TR, on the training image, to thereby generate the second manipulated image.

As one example, the image-manipulating network 111 may crop at least one region, corresponding to the first target region TR, on an image with a size larger than that of the first manipulated image included in the image pyramid corresponding to the training image, to thereby generate the second manipulated image. Also, the image-manipulating network 111 may crop at least one region, on the training image, corresponding to the first target region TR and then may resize the cropped image, to thereby generate the second manipulated image. Herein, the second manipulated image may be resized such that its size is larger than that of the first target region. In order to do so, the image-manipulating network 111 may resize the cropped image to be corresponding to a size of a next image of the first manipulated image included in the image pyramid of the training image, to thereby generate the second manipulated image.

Next, the learning device 100 may repeat the above processes using the generated second manipulated image, to thereby efficiently detect a small-sized object on the training image, that is, an object located in the long distance.

In detail, the learning device 100 may perform or support another device to perform processes of (i) instructing the target object estimating network 125 to search for a (k−1)-th target region, corresponding to an area, where the target object is estimated as located, on a (k−1)-th manipulated image, by referring to one or more (k−1)-th object proposals on the (k−1)-th manipulated image, (ii) if a k-th manipulated image is acquired which corresponds to the (k−1)-th target region on the training image or its resized images, instructing the convolutional layer 121 to apply the convolution operations to the k-th manipulated image, to thereby generate a k-th feature map, by increasing k from 2 to n. Then, the learning device 100 may instruct the RPN 122 to generate k-th object proposals corresponding to each of the k-th objects in the k-th manipulated image by using the k-th feature map, and may instruct the pooling layer 123 to apply the pooling operations to each region, on the k-th feature map, corresponding to each of the k-th object proposals, to thereby generate at least one k-th pooled feature map. Thereafter, the learning device 100 may instruct the FC layer 124 to apply the fully connected operation to the k-th pooled feature map, to thereby generate k-th object detection information corresponding to the k-th objects.

As one example, by referring to FIG. 5, object detection may be performed on the first manipulated image MI1, corresponding to a first image P1 which is a smallest-sized image included in the image pyramid, and thus the first target region TR1 may be estimated, and the object detection may be performed on the second manipulated image MI2, corresponding to the first target region TR1 on a second image P2 which is a next smallest-sized image included in the image pyramid, and a second target region TR2 may be identified, and the object detection may be performed on a third manipulated image MI3, corresponding to the second target region TR2 on a second image P3 which is a next smallest-sized image to the P2 included in the image pyramid. Thus, as a result, k-th objects with specific sizes, preferably small-sized objects in the long distance, are easily detected thanks to less computational time.

Herein, sizes of the first target region to an (n−1)-th target region on the first manipulated image to an (n−1)-th manipulated image may be controlled to be the same, or each of the sizes may be set to be different with each other according to each of sizes of the manipulated images while each of their corresponding aspect ratios is set as identical. Also, the sizes of the first manipulated image to the n-th manipulated image may be set as the same.

Then the learning device 100 may perform processes of (i) instructing a target object merging network 126 to generate merged object proposals by merging the first object proposals to the n-th object proposals, and generate merged object detection information by merging the first object detection information to the n-th object detection information.

As one example, by referring to FIG. 6, supposing that at least one specific identical object is located on the (k−1)-th manipulated image MI(k−1) and the k-th manipulated image MI(k), and that at least one object proposal, corresponding to the specific identical object, among the (k−1)-th object proposals on the (k−1)-th manipulated image MI(k−1), is a (k−1)-th specific object proposal, and that at least one object proposal, corresponding to the specific identical object, among the k-th object proposals on the k-th manipulated image MI(k), is a k-th specific object proposal, the learning device 100 may instruct the target object merging network 126 to determine whether an IOU between the (k−1)-th specific object proposal PB(k−1) and the k-th specific object proposal PB(k) is equal to or greater than a first threshold. Herein, the IOU is an intersection over union. Then, if the IOU is determined as less than the first threshold, an adjusted IOU between the (k−1)-th specific object proposal PB(k−1) and the k-th specific object proposal PB(k) may be calculated.

Herein, the adjusted IOU may be an IOU calculated by referring to an area, i.e., intersection(PB(k−1), MI(K)), corresponding to the (k−1)-th specific object proposal PB(k−1) on the k-th manipulated image MI(k) and an area, i.e., intersection(PB(k), MI(k−1)), corresponding to the k-th specific object proposal PB(k) on the (k−1)-th manipulated image MI(k−1).

And if the adjusted IOU is determined as equal to or greater than a second threshold, the learning device 100 may select (i) one of a higher probability among the (k−1)-th specific object proposal PB(k−1) and the k-th specific object proposal PB(k), or (ii) one of a larger area calculated on the training image among the (k−1)-th specific object proposal PB(k−1) and the k-th specific object proposal PB(k), to thereby output the selected one as a specific merged object proposal corresponding to the specific identical object.

However, if the adjusted IOU is determined as less than the second threshold, the learning device 100 may determine that the (k−1)-th specific object proposal PB(k−1) and the k-th specific object proposal PB(k) respectively correspond to different objects. That is, if the IOU between the (k−1)-th specific object proposal PB(k−1) and the k-th specific object proposal PB(k) is determined as less than the first threshold and the adjusted IOU between those two is determined as less than the second threshold, the learning device 100 may determine that the (k−1)-th specific object proposal PB(k−1) and the k-th specific object proposal PB(k) respectively correspond to different objects.

In the meantime, if the IOU between the (k−1)-th specific object proposal PB(k−1) and the k-th specific object proposal PB(k) is determined as equal to or greater than the first threshold, the learning device may select (i) one of a higher probability among the (k−1)-th specific object proposal PB(k−1) and the k-th specific object proposal PB(k), or (ii) one of a larger area calculated on each of the manipulated images MI(k−1) and MI(k) among the (k−1)-th specific object proposal PB(k−1) and the k-th specific object proposal PB(k), to thereby output the selected one as the specific merged object proposal corresponding to the specific identical object.

Also, by referring to FIG. 6, supposing that at least one specific identical object is located on the (k−1)-th manipulated image MI(k−1) and the k-th manipulated image MI(k), and that at least one object bounding box, corresponding to the specific identical object, among object bounding boxes included in the (k−1)-th object detection information on the (k−1)-th manipulated image MI(k−1), is a (k−1)-th specific object bounding box BB(k−1), and that at least one object bounding box, corresponding to the specific identical object, among object bounding boxes included in the (k−1)-th object detection information on the k-th manipulated image MI(k), is a k-th specific object bounding box BB(k), the learning device 100 may instruct the target object merging network 126 to determine whether the IOU between the (k−1)-th specific object bounding box BB(k−1) and the k-th specific object bounding box BB(k) is equal to or greater than the first threshold. Herein, the first threshold used for the IOU between the object proposals and the first threshold used for the IOU between the object bounding boxes may be the same or different. Also, the second threshold used for the IOU between the object proposals and the second threshold used for the IOU between the object bounding boxes may be the same or may be different. Then, if the IOU between the bounding boxes is determined as less than the first threshold, an adjusted IOU between the (k−1)-th specific object bounding box BB(k−1) and the k-th specific object bounding box BB(k) may be calculated.

Herein, the adjusted IOU may be an IOU calculated by referring to an area, i.e., intersection(BB(k−1), MI(K)), corresponding to the (k−1)-th specific object bounding box BB(k−1) on the k-th manipulated image MI(k) and an area, i.e., intersection(BB(k), MI(k−1)), corresponding to the k-th specific object bounding box BB(k) on the (k−1)-th manipulated image MI(k−1).

And if the adjusted IOU is determined as equal to or greater than the second threshold, the learning device 100 may select (i) one of a higher probability among the (k−1)-th specific object bounding box BB(k−1) and the k-th specific object bounding box BB(k), or (ii) one of a larger area calculated on the training image among the (k−1)-th specific object bounding box BB(k−1) and the k-th specific object bounding box BB(k), to thereby output the selected one as a specific merged object detection information corresponding to the specific identical object. Herein, the second threshold used for the IOU between the object proposals and the second threshold used for the IOU between the object bounding boxes may be the same or may be different.

However, if the adjusted IOU is determined as less than the second threshold, the learning device 100 may determine that the (k−1)-th specific object bounding box BB(k−1) and the k-th specific object bounding box BB(k) respectively correspond to different objects. That is, if the IOU between the (k−1)-th specific object bounding box BB(k−1) and the k-th specific object bounding box BB(k) is determined as less than the first threshold and the adjusted IOU between those two is determined as less than the second threshold, the learning device 100 may determine that the (k−1)-th specific object bounding box BB(k−1) and the k-th specific object bounding box BB(k) respectively correspond to different objects.

In the meantime, if the IOU between the (k−1)-th specific object bounding box BB(k−1) and the k-th specific object bounding box BB(k) is determined as equal to or greater than the first threshold, the learning device may select (i) one of a higher probability among the (k−1)-th specific object bounding box BB(k−1) and the k-th specific object bounding box BB(k), or (ii) one of a larger area calculated on each of the manipulated images MI(k−1) and MI(k) among the (k−1)-th specific object bounding box BB(k−1) and the k-th specific object bounding box BB(k), to thereby output the selected one as the specific merged object detection information corresponding to the specific identical object.

By using the method above, the objects with various sizes on the training image, especially the objects in the long distance which are small-sized, are detected efficiently. Also, computational load is reduced since only regions corresponding to the estimated target regions are used and thus computation time of the object detector based on the CNN is reduced.

Also, in the description so far, it is assumed that there is just one target object on the training image, however, even in case there are multiple target objects on the training image, detection of each of the target objects is possible by using each target region corresponding to each of the target objects on the training image as in the method mentioned above.

Then, the learning device 100 may instruct at least one FC loss layer 127 to generate one or more FC losses by referring to the merged object detection information and its corresponding GT, to thereby adjust at least part of parameters of the FC layer 124 and the convolutional layer 121 by back-propagating the FC losses.

Also, the learning device 100 may instruct at least one RPN loss layer 128 to generate one or more RPN losses by referring to the merged object proposals and their corresponding GTs, to thereby adjust at least part of parameters of the RPN 122 by backpropagating the RPN losses.

FIG. 7 is a drawing schematically illustrating a testing device for testing the object detector based on the CNN using the target object estimating network and the target object merging network in accordance with one example embodiment of the present disclosure, and by referring to FIG. 7, the testing device 200 may include a communication part 210 and a processor 220.

First, the communication part 210 may acquire or support another device to acquire at least one test image.

In addition, the testing device may further include a memory 215 capable of storing computer readable instructions for performing following processes. As one example, the processor, the memory, a medium, etc. may be integrated with an integrated processor.

Herein, the object detector based on the CNN using the target object estimating network and the target object merging network may have been learned by the learning method described by referring to FIGS. 1 to 6.

For reference, in the description below, the phrase "for training" is added for terms related to the learning processes, and the phrase "for testing" is added for terms related to testing processes, to avoid possible confusion.

That is, a learning device may have performed processes of (a) if at least one training image has been acquired, (i) instructing the convolutional layers to generate at least one first feature map for training by applying the convolution operations to at least one first manipulated image for training corresponding to the training image, (ii) instructing the RPN to generate one or more first object proposals for training corresponding to each of one or more first objects for training in the first manipulated image for training by using the first feature map for training, (iii) instructing the pooling layer to apply the pooling operations to each region, corresponding to each of the first object proposals for training, on the first feature map for training, to thereby generate at least one first pooled feature map for training, and (iv) instructing the FC layer to apply the fully connected operation to the first pooled feature map for training, to thereby generate first object detection information for training corresponding to the first objects for training; (b) (i) instructing the target object estimating network to search for a (k−1)-th target region for training, corresponding to an area, where at least one target object for training is estimated as located, on a (k−1)-th manipulated image for training, by referring to one or more (k−1)-th object proposals for training on the (k−1)-th manipulated image for training, (ii) if a k-th manipulated image for training is acquired which corresponds to the (k−1)-th target region for training on the training image or its one or more resized images, instructing the convolutional layers to apply the convolution operations to the k-th manipulated image for training, to thereby generate a k-th feature map for training, (iii) instructing the RPN to generate one or more k-th object proposals for training corresponding to each of k-th objects for training on the k-th manipulated image for training by referring to the k-th feature map for training, (iv) instructing the pooling layer to apply the pooling operations to each region, corresponding to each of the k-th object proposals for training, on the k-th feature map for training, to thereby generate at least one k-th pooled feature map for training, (v) instructing the FC layer to apply the fully connected operation to the k-th pooled feature map for training, to thereby generate k-th object detection information for training corresponding to the k-th objects for training, by increasing k from 2 to n; and (c) (i) instructing the target object merging network to generate merged object proposals for training by merging the first object proposals for training to the n-th object proposals for training, and generate merged object detection information for training by merging the first object detection information for training to the n-th object detection information for training, and (ii) instructing the FC loss layer to generate the FC losses by referring to the merged object detection information for training and its corresponding GT, to thereby learn at least part of parameters of the FC layer and the convolutional layers by backpropagating the FC losses.

Also, the learning device may have instructed at least one RPN loss layer to generate one or more RPN losses by referring to the merged object proposals for training and their corresponding GTs, to thereby adjust at least part of parameters of the RPN by backpropagating the RPN losses.

Next, the processor 220 may perform or support another device to perform processes of (i) instructing the convolutional layers to generate at least one first feature map for testing by applying the convolution operations to at least one first manipulated image for testing corresponding to the test image, (ii) instructing the RPN to generate one or more first object proposals for testing corresponding to each of one or more first objects for testing in the first manipulated image for testing by using the first feature map for testing, (iii) instructing the pooling layer to apply the pooling operations to each region, corresponding to each of the first object proposals for testing, on the first feature map for testing, to thereby generate at least one first pooled feature map for testing, (iv) instructing the FC layer to apply the fully connected operation to the first pooled feature map for testing, to thereby generate first object detection information for testing corresponding to the first objects for testing. Then, the processor 220 may perform or support another device to perform processes of (i) instructing the target object estimating network to search for a (k−1)-th target region for testing, corresponding to an area, where at least one target object for testing is estimated as located, on a (k−1)-th manipulated image for testing, by referring to one or more (k−1)-th object proposals for testing on the (k−1)-th manipulated image for testing (ii) if a k-th manipulated image for testing is acquired which corresponds to the (k−1)-th target region for testing on the test image or its resized images, instructing the convolutional layers to apply the convolution operations to the k-th manipulated image for testing, to thereby generate a k-th feature map for testing, (iii) instructing the RPN to generate one or more k-th object proposals for testing corresponding to each of one or more k-th objects for testing on the k-th manipulated image for testing by referring to the k-th feature map for testing, (iv) instructing the pooling layer to apply the pooling operations to each region, on the k-th feature map for testing, corresponding to each of the k-th object proposals for testing, to thereby generate at least one k-th pooled feature map for testing, (v) instructing the FC layer to apply the fully connected operation to the k-th pooled feature map for testing, to thereby generate k-th object detection information for testing corresponding to the k-th objects for testing, by increasing k from 2 to n. Then the processor 220 may perform processes of (i) instructing the target object merging network to generate merged object proposals for testing by merging the first object proposals for testing to the n-th object proposals for testing, and generate merged object detection information for testing by merging the first object detection information for testing to the n-th object detection information for testing.

Herein, the testing device 200 in accordance with one example embodiment of the present disclosure may be a computing device, and may be any device with a processor capable of computation. For reference, although FIG. 7 shows the single testing device 200, but the scope of the present disclosure is not limited thereto. For example, the testing device may be configured as several devices to perform its functions.

A method for testing the object detector based on the CNN using the target object estimating network and the target object merging network by using the testing device 200 in accordance with one example embodiment of the present disclosure is described by referring to FIG. 8 as follows. In the description below, the part easily deducible from the learning method described by referring to FIGS. 1 to 6 will be omitted.

First, on condition that at least part of parameters of an FC layer 224, a convolutional layer 221, and an RPN 222 has been learned according to the learning method described by referring to FIGS. 1 to 6, if the test image is inputted, the testing device 200 may instruct the convolutional layer 221 to apply the convolution operations to the first manipulated image for testing corresponding to the test image, to thereby generate the first feature map for testing. Herein, the convolutional layer 221 may be a single convolutional layer or multiple convolutional layers.

Herein, the testing device 200 may instruct an image-manipulating network 211 to generate an image pyramid including images with different sizes which are created by manipulating the test image, and may input one image included in the image pyramid into the convolutional layer 221 as the first manipulated image for testing.

Next, the testing device 200 may instruct the RPN 222 to generate one or more first object proposals for testing corresponding to each of the first objects for testing in the first manipulated image for testing by using the first feature map for testing.

Herein, each of the first object proposals for testing may include information on each proposal box for testing having location information corresponding to each of the first objects for testing, i.e., a tagged area and information on whether it is an object.

Next, the testing device 200 may instruct a pooling layer 223 to generate at least one first pooled feature map for testing by applying the pooling operations to at least one region corresponding to the first object proposals for testing on the first feature map for testing, and may instruct the FC layer 224 to generate first object detection information for testing corresponding to the first objects for testing by applying the fully connected operation to the first pooled feature map for testing.

Herein, the first object detection information for testing may include information on bounding boxes for testing, i.e., location information on each of the first objects for testing, and class information on each of the first objects for testing corresponding to the first object proposals for testing.

Then, the testing device 200 may instruct a target object estimating network 225 to search for a first target region for testing, corresponding to an area, where at least one target object for testing is estimated as located, on the first manipulated image for testing, by referring to the first object proposals for testing on the first manipulated image for testing.

Next, the testing device 200 may acquire or support another device to acquire a second manipulated image for testing corresponding to the first target region for testing on the test image or its resized test images.

Herein, the testing device 200 may instruct the image-manipulating network 211 to generate the resized test image by enlarging a size of the test image into a size larger than that of the first manipulated image for testing, and crop at least one region, corresponding to the first target region for testing, on the resized test image, to thereby generate the second manipulated image for testing, or crop and resize at least one region, corresponding to the first target region for testing, on the test image, to thereby generate the second manipulated image for testing.

As one example, the image-manipulating network 211 may crop at least one region, corresponding to the first target region for testing, on an image with a size larger than that of the first manipulated image for testing included in the image pyramid corresponding to the test image, to thereby generate the second manipulated image for testing. Also, the image-manipulating network 211 may crop at least one region, corresponding to the first target region for testing, and resize the cropped image, on the test image, to thereby generate the second manipulated image for testing. Herein, the second manipulated image for testing may be resized such that its size is larger than that of the first target region for testing. In order to do so, the image-manipulating network 211 may resize an image cropped to be corresponding to a size of a next image of the first manipulated image for testing included in the image pyramid of the test image, to thereby generate the second manipulated image for testing.

Next, the testing device 200 may repeat the above processes using the generated second manipulated image for testing, to thereby efficiently detect a small-sized object on the test image, that is, an object located in the long distance.

That is, the testing device 200 may perform or support another device to perform processes of (i) instructing the target object estimating network 225 to search for a (k−1)-th target region for testing, corresponding to an area, where at least one target object for testing is estimated as located, on a (k−1)-th manipulated image for testing, by referring to one or more (k−1)-th object proposals for testing on the (k−1)-th manipulated image for testing, (ii) if a k-th manipulated image for testing is acquired which corresponds to the (k−1)-th target region for testing on the test image or its resized images, instructing the convolutional layer 221 to apply the convolution operations to the k-th manipulated image for testing, to thereby generate a k-th feature map for testing, by increasing k from 2 to n. Then, the testing device 200 may instruct the RPN 222 to generate k-th object proposals for testing corresponding to each of the k-th objects for testing in the k-th manipulated image for testing by using the k-th feature map for testing, and may instruct the pooling layer 223 to apply the pooling operations to each region, corresponding to each of the k-th object proposals for testing, on the k-th feature map for testing, to thereby generate at least one k-th pooled feature map for testing. Thereafter, the testing device 200 may instruct the FC layer 224 to apply the fully connected operation to the k-th pooled feature map for testing, to thereby generate k-th object detection information for testing corresponding to the k-th objects for testing.

Then the testing device 200 may perform processes of (i) instructing the target object merging network 226 to generate merged object proposals for testing by merging the first object proposals for testing to the n-th object proposals for testing, and generate merged object detection information for testing by merging the first object detection information for testing to the n-th object detection information for testing.

As one example, by referring to FIG. 6, supposing that at least one specific identical object for testing is located on the (k−1)-th manipulated image for testing MI(k−1) and the k-th manipulated image for testing MI(k), and that at least one object proposal for testing, corresponding to the specific identical object for testing, among the (k−1)-th object proposals for testing on the (k−1)-th manipulated image for testing MI(k−1), is a (k−1)-th specific object proposal for testing, and that at least one object proposal for testing, corresponding to the specific identical object for testing, among the k-th object proposals for testing on the k-th manipulated image for testing MI(k), is a k-th specific object proposal for testing, the testing device 200 may instruct the target object merging network 226 to determine whether an IOU for testing between the (k−1)-th specific object proposal for testing PB(k−1) and the k-th specific object proposal for testing PB(k) is equal to or greater than a first threshold. Herein, the IOU is an intersection over union. Then, if the IOU for testing is determined as less than the first threshold, an adjusted IOU for testing between the (k−1)-th specific object proposal for testing PB(k−1) and the k-th specific object proposal for testing PB(k) may be calculated.

Herein, the adjusted IOU for testing may be an IOU calculated by referring to an area, i.e., intersection(PB(k−1), MI(K)), corresponding to the (k−1)-th specific object proposal for testing PB(k−1) on the k-th manipulated image for testing MI(k) and an area, i.e., intersection(PB(k), MI(k−1)), corresponding to the k-th specific object proposal for testing PB(k) on the (k−1)-th manipulated image for testing MI(k−1).

And if the adjusted IOU for testing is determined as equal to or greater than a second threshold, the testing device 200 may select (i) one of a higher probability among the (k−1)-th specific object proposal for testing PB(k−1) and the k-th specific object proposal for testing PB(k), or (ii) one of a larger area calculated on the test image among the (k−1)-th specific object proposal for testing PB(k−1) and the k-th specific object proposal for testing PB(k), to thereby output the selected one as a specific merged object proposal for testing corresponding to the specific identical object for testing.

However, if the adjusted IOU for testing is determined as less than the second threshold, the testing device 200 may determine that the (k−1)-th specific object proposal for testing PB(k−1) and the k-th specific object proposal for testing PB(k) respectively correspond to different objects for testing. That is, if the IOU for testing between the (k−1)-th specific object proposal for testing PB(k−1) and the k-th specific object proposal for testing PB(k) is determined as less than the first threshold and the adjusted IOU for testing between those two is determined as less than the second threshold, the testing device 200 may determine that the (k−1)-th specific object proposal for testing PB(k−1) and the k-th specific object proposal for testing PB(k) respectively correspond to different objects for testing.

In the meantime, if the IOU for testing between the (k−1)-th specific object proposal for testing PB(k−1) and the k-th specific object proposal for testing PB(k) is determined as equal to or greater than the first threshold, the testing device may select (i) one of a higher probability among the (k−1)-th specific object proposal for testing PB(k−1) and the k-th specific object proposal for testing PB(k), or (ii) one of a larger area calculated on each of the manipulated images for testing MI(k−1) and MI(k) among the (k−1)-th specific object proposal for testing PB(k−1) and the k-th specific object proposal for testing PB(k), to thereby output the selected one as the specific merged object proposal for testing corresponding to the specific identical object for testing.

Also, by referring to FIG. 6, supposing that at least one specific identical object for testing is located on the (k−1)-th manipulated image for testing MI(k−1) and the k-th manipulated image for testing MI(k), and that at least one object bounding box for testing, corresponding to the specific identical object for testing, among object bounding boxes for testing included in the (k−1)-th object detection information for testing on the (k−1)-th manipulated image for testing MI(k−1), is a (k−1)-th specific object bounding box for testing BB(k−1), and that at least one object bounding box for testing, corresponding to the specific identical object for testing, among object bounding boxes for testing included in the (k−1)-th object detection information for testing on the k-th manipulated image for testing MI(k), is a k-th specific object bounding box for testing BB(k), the testing device 200 may instruct the target object merging network 226 to determine whether the IOU for testing between the (k−1)-th specific object bounding box for testing BB(k−1) and the k-th specific object bounding box for testing BB(k) is equal to or greater than the first threshold. Herein, the first threshold used for the IOU for testing between the object proposals for testing and the first threshold used for the IOU for testing between the object bounding boxes for testing may be the same or different. Then, if the IOU for testing between the bounding boxes for testing is determined as less than the first threshold, an adjusted IOU for testing between the (k−1)-th specific object bounding box for testing BB(k−1) and the k-th specific object bounding box for testing BB(k) may be calculated.

Herein, the adjusted IOU for testing may be an IOU calculated by referring to an area, i.e., intersection(BB(k−1), MI(K)), corresponding to the (k−1)-th specific object bounding box for testing BB(k−1) on the k-th manipulated image for testing MI(k) and an area, i.e., intersection(BB(k), MI(k−1)), corresponding to the k-th specific object bounding box for testing BB(k) on the (k−1)-th manipulated image for testing MI(k−1).

And if the adjusted IOU for testing is determined as equal to or greater than the second threshold, the testing device 200 may select (i) one of a higher probability among the (k−1)-th specific object bounding box for testing BB(k−1) and the k-th specific object bounding box for testing BB(k), or (ii) one of a larger area calculated on the test image among the (k−1)-th specific object bounding box for testing BB(k−1) and the k-th specific object bounding box for testing BB(k), to thereby output the selected one as a specific merged object detection information for testing corresponding to the specific identical object for testing. Herein, the second threshold used for the IOU for testing between the object proposals for testing and the second threshold used for the IOU for testing between the object bounding boxes for testing may be the same or may be different.

However, if the adjusted IOU for testing is determined as less than the second threshold, the testing device 200 may determine that the (k−1)-th specific object bounding box for testing BB(k−1) and the k-th specific object bounding box for testing BB(k) respectively correspond to different objects for testing. That is, if the IOU for testing between the (k−1)-th specific object bounding box for testing BB(k−1) and the k-th specific object bounding box for testing BB(k) is determined as less than the first threshold and the adjusted IOU for testing between those two is determined as less than the second threshold, the testing device 200 may determine that the (k−1)-th specific object bounding box for testing BB(k−1) and the k-th specific object bounding box for testing BB(k) respectively correspond to different objects for testing.

In the meantime, if the IOU for testing between the (k−1)-th specific object bounding box for testing BB(k−1) and the k-th specific object bounding box for testing BB(k) is determined as equal to or greater than the first threshold, the testing device may select (i) one of a higher probability among the (k−1)-th specific object bounding box for testing BB(k−1) and the k-th specific object bounding box for testing BB(k), or (ii) one of a larger area calculated on each of the manipulated images for testing MI(k−1) and MI(k) among the (k−1)-th specific object bounding box for testing BB(k−1) and the k-th specific object bounding box for testing BB(k), to thereby output the selected one as the specific merged object detection information for testing corresponding to the specific identical object for testing.

By using the method above, the objects with various sizes on the test image, especially the objects in the long distance which are small-sized, are detected efficiently. Also, computational load is reduced since only regions corresponding to the estimated target regions are used and thus computation time of the object detector based on the CNN is reduced.

Also, in the description so far, it is assumed that there is just one target object on the test image, however, in case there are multiple target objects on the test image, detection of each of the target objects is possible by using each target region corresponding to each of the target objects on the test image as in the method mentioned above.

The present disclosure has an effect of detecting small objects in an image with ease by using target regions, where at least one target object is estimated as located, on each of the manipulated images that are images with various sizes into which the input image is transformed.

The present disclosure has another effect of minimizing computational load and time by detecting small objects in an image with ease by using manipulated images, i.e., the cropped target regions where at least one target object is estimated as located on each of the manipulated images that are images with various sizes into which the input image is transformed.

The CNN may be adaptable to customer's requirements such as KPI (key performance index) by using a target object estimating network and a target object merging network. The CNN can be redesigned when scales of objects change as a focal length or a resolution changes depending on the KPI. The method can be performed usefully for multi-camera, SVM (surround view monitor), and the like, as accuracy of 2D bounding boxes improves.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning parameters of an object detector based on a convolutional neural network (CNN) by using a target object estimating network and a target object merging network, comprising steps of:

(a) a learning device, when at least one training image is acquired, (i) instructing one or more convolutional layers to generate at least one first feature map by applying one or more convolution operations to at least one first manipulated image corresponding to the training image, (ii) instructing a region proposal network (RPN) to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, and (iv) instructing a fully connected layer (FC) layer to apply at least one fully connected operation to the first pooled feature map, to thereby generate first object detection information corresponding to the first objects;

(b) the learning device (i) instructing the target object estimating network to search for a (k−1)-th target region, corresponding to an area, where at least one target object is estimated as located, on a (k−1)-th manipulated image, by referring to one or more (k−1)-th object proposals on the (k−1)-th manipulated image, (ii) when a k-th manipulated image is acquired which corresponds to the (k−1)-th target region on the training image or its one or more resized images, instructing the convolutional layers to apply the convolution operations to the k-th manipulated image, to thereby generate a k-th feature map, (iii) instructing the RPN to generate one or more k-th object proposals corresponding to each of k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, and (v) instructing the FC layer to apply the fully connected operation to the k-th pooled feature map, to thereby generate k-th object detection information corresponding to the k-th objects, by increasing k from 2 to n, where n is a positive integer greater than 2; and (c) the learning device (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding ground truth (GT), to thereby learn at least part of parameters of the FC layer and the convolutional layers by backpropagating the FC losses.

2. The method of claim 1, wherein, at the step of (c), the learning device instructs an RPN loss layer to calculate one or more RPN losses by referring to the merged object proposals and their corresponding GTs, to thereby learn parameters of the RPN by backpropagating the RPN losses.

3. The method of claim 1, wherein, at the step of (c), supposing that at least one specific identical object is located on the (k−1)-th manipulated image and the k-th manipulated image, and that at least one object proposal, corresponding to the specific identical object, among the (k−1)-th object proposals on the (k−1)-th manipulated image, is a (k−1)-th specific object proposal, and that at least one object proposal, corresponding to the specific identical object, among the k-th object proposals on the k-th manipulated image, is a k-th specific object proposal, the learning device instructs the target object merging network to determine whether an intersection over union (IOU) between the (k−1)-th specific object proposal and the k-th specific object proposal is equal to or greater than a first threshold, then when the IOU is determined as less than the first threshold, calculates an adjusted IOU between the (k−1)-th specific object proposal and the k-th specific object proposal, and when the adjusted IOU is determined as equal to or greater than a second threshold, selects (i) one of a higher probability among the (k−1)-th specific object proposal and the k-th specific object proposal, or (ii) one of a larger area calculated on the training image among the (k−1)-th specific object proposal and the k-th specific object proposal, to thereby output the selected one as a specific merged object proposal corresponding to the specific identical object, wherein the IOU is an intersection over union.

4. The method of claim 3, wherein the adjusted IOU is calculated by referring to an area corresponding to the (k−1)-th specific object proposal on the k-th manipulated image and an area corresponding to the k-th specific object proposal on the (k−1)-th manipulated image.

5. The method of claim 3, wherein the learning device instructs the target object merging network to determine whether the IOU is equal to or greater than the first threshold, and when the IOU is determined as equal to or greater than the first threshold, selects (i) one of a higher probability among the (k−1)-th specific object proposal and the k-th specific object proposal, or (ii) one of a larger area calculated on each of the manipulated images among the (k−1)-th specific object proposal and the k-th specific object proposal, to thereby output the selected one as the specific merged object proposal corresponding to the specific identical object.

6. The method of claim 1, wherein, at the step of (c), supposing that at least one specific identical object is located on the (k−1)-th manipulated image and the k-th manipulated image, and that at least one object bounding box, corresponding to the specific identical object, among object bounding boxes included in the (k−1)-th object detection information on the (k−1)-th manipulated image, is a (k−1)-th specific object bounding box, and that at least one object bounding box, corresponding to the specific identical object, among object bounding boxes included in the (k−1)-th object detection information on the k-th manipulated image, is a k-th specific object bounding box, the learning device instructs the target object merging network to determine whether an IOU between the (k−1)-th specific object bounding box and the k-th specific object bounding box is equal to or greater than a first threshold, then when the IOU is determined as less than the first threshold, calculates an adjusted IOU between the (k−1)-th specific object bounding box and the k-th specific object bounding box, and when the adjusted IOU is determined as equal to or greater than a second threshold, selects (i) one of a higher probability among the (k−1)-th specific object bounding box and the k-th specific object bounding box, or (ii) one of a larger area calculated on the training image among the (k−1)-th specific object bounding box and the k-th specific object bounding box, to thereby output the selected one as a specific merged object detection information corresponding to the specific identical object, wherein the IOU is an intersection over union.

7. The method of claim 6, wherein the adjusted IOU is calculated by referring to an area corresponding to the (k−1)-th specific object bounding box on the k-th manipulated image and an area corresponding to the k-th specific object bounding box on the (k−1)-th manipulated image.

8. The method of claim 6, wherein the learning device instructs the target object merging network to determine whether the IOU is greater than the first threshold, and when the IOU is determined as equal to or greater than the first threshold, selects (i) one of a higher probability among the (k−1)-th specific object bounding box and the k-th specific object bounding box, or (ii) one of a larger area calculated on each of the manipulated images among the (k−1)-th specific object bounding box and the k-th specific object bounding box, to thereby output the selected one as the specific merged object detection information corresponding to the specific identical object.

9. A learning device for learning parameters of an object detector based on a convolutional neural network (CNN) by using a target object estimating network and a target object merging network, comprising:

at least one memory that stores instructions; and
at least one processor configured to execute the instructions to: perform processes of (I) (i) instructing one or more convolutional layers to generate at least one first feature map by applying one or more convolution operations to at least one first manipulated image corresponding to at least one training image, (ii) instructing a region proposal network (RPN) to generate one or more first object proposals corresponding to each of one or more first objects in the first manipulated image by using the first feature map, (iii) instructing a pooling layer to apply one or more pooling operations to each region, corresponding to each of the first object proposals, on the first feature map, to thereby generate at least one first pooled feature map, and (iv) instructing a fully connected layer (FC) layer to apply at least one fully connected operation to the first pooled feature map, to thereby generate first object detection information corresponding to the first objects, (II) (i) instructing the target object estimating network to search for a (k−1)-th target region, corresponding to an area, where at least one target object is estimated as located, on a (k−1)-th manipulated image, by referring to one or more (k−1)-th object proposals on the (k−1)-th manipulated image, (ii) when a k-th manipulated image is acquired which corresponds to the (k−1)-th target region on the training image or its one or more resized images, instructing the convolutional layers to apply the convolution operations to the k-th manipulated image, to thereby generate a k-th feature map, (iii) instructing the RPN to generate one or more k-th object proposals corresponding to each of k-th objects on the k-th manipulated image by referring to the k-th feature map, (iv) instructing the pooling layer to apply the pooling operations to each region, corresponding to each of the k-th object proposals, on the k-th feature map, to thereby generate at least one k-th pooled feature map, and (v) instructing the FC layer to apply the fully connected operation to the k-th pooled feature map, to thereby generate k-th object detection information corresponding to the k-th objects, by increasing k from 2 to n, where n is a positive integer greater than 2, and (III) (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding ground truth (GT), to thereby learn at least part of parameters of the FC layer and the convolutional layers by backpropagating the FC losses.

10. The learning device of claim 9, wherein, at the process of (III), the processor instructs an RPN loss layer to calculate one or more RPN losses by referring to the merged object proposals and their corresponding GTs, to thereby learn parameters of the RPN by backpropagating the RPN losses.

11. The learning device of claim 9, wherein, at the process of (III), supposing that at least one specific identical object is located on the (k−1)-th manipulated image and the k-th manipulated image, and that at least one object proposal, corresponding to the specific identical object, among the (k−1)-th object proposals on the (k−1)-th manipulated image, is a (k−1)-th specific object proposal, and that at least one object proposal, corresponding to the specific identical object, among the k-th object proposals on the k-th manipulated image, is a k-th specific object proposal,
the processor instructs the target object merging network to determine whether an intersection over union (IOU) between the (k−1)-th specific object proposal and the k-th specific object proposal is equal to or greater than a first threshold, then when the IOU is determined as less than the first threshold, calculates an adjusted IOU between the (k−1)-th specific object proposal and the k-th specific object proposal, and when the adjusted IOU is determined as equal to or greater than a second threshold, selects (i) one of a higher probability among the (k−1)-th specific object proposal and the k-th specific object proposal, or (ii) one of a larger area calculated on the training image among the (k−1)-th specific object proposal and the k-th specific object proposal, to thereby output the selected one as a specific merged object proposal corresponding to the specific identical object, wherein the IOU is an intersection over union.

12. The learning device of claim 11, wherein the adjusted IOU is calculated by referring to an area corresponding to the (k−1)-th specific object proposal on the k-th manipulated image and an area corresponding to the k-th specific object proposal on the (k−1)-th manipulated image.

13. The learning device of claim 11, wherein the processor instructs the target object merging network to determine whether the IOU is equal to or greater than the first threshold, and when the IOU is determined as equal to or greater than the first threshold, selects (i) one of a higher probability among the (k−1)-th specific object proposal and the k-th specific object proposal, or (ii) one of a larger area calculated on each of the manipulated images among the (k−1)-th specific object proposal and the k-th specific object proposal, to thereby output the selected one as the specific merged object proposal corresponding to the specific identical object.

14. The learning device of claim 9, wherein, at the process of (III), supposing that at least one specific identical object is located on the (k−1)-th manipulated image and the k-th manipulated image, and that at least one object bounding box, corresponding to the specific identical object, among object bounding boxes included in the (k−1)-th object detection information on the (k−1)-th manipulated image, is a (k−1)-th specific object bounding box, and that at least one object bounding box, corresponding to the specific identical object, among object bounding boxes included in the (k−1)-th object detection information on the k-th manipulated image, is a k-th specific object bounding box,
the processor instructs the target object merging network to determine whether an IOU between the (k−1)-th specific object bounding box and the k-th specific object bounding box is equal to or greater than a first threshold, then when the IOU is determined as less than the first threshold, calculates an adjusted IOU between the (k−1)-th specific object bounding box and the k-th specific object bounding box, and when the adjusted IOU is determined as equal to or greater than a second threshold, selects (i) one of a higher probability among the (k−1)-th specific object bounding box and the k-th specific object bounding box, or (ii) one of a larger area calculated on the training image among the (k−1)-th specific object bounding box and the k-th specific object bounding box, to thereby output the selected one as a specific merged object detection information corresponding to the specific identical object, wherein the IOU is an intersection over union.

15. The learning device of claim 14, wherein the adjusted IOU is calculated by referring to an area corresponding to the (k−1)-th specific object bounding box on the k-th manipulated image and an area corresponding to the k-th specific object bounding box on the (k−1)-th manipulated image.

16. The learning device of claim 14, wherein the processor instructs the target object merging network to determine whether the IOU is greater than the first threshold, and when the IOU is determined as equal to or greater than the first threshold, selects (i) one of a higher probability among the (k−1)-th specific object bounding box and the k-th specific object bounding box, or (ii) one of a larger area calculated on each of the manipulated images among the (k−1)-th specific object bounding box and the k-th specific object bounding box, to thereby output the selected one as the specific merged object detection information corresponding to the specific identical object.

* * * * *